July 21, 1931. J. A. VINCENT 1,815,533
TIRE CHUCK
Filed May 25, 1929 2 Sheets-Sheet 2
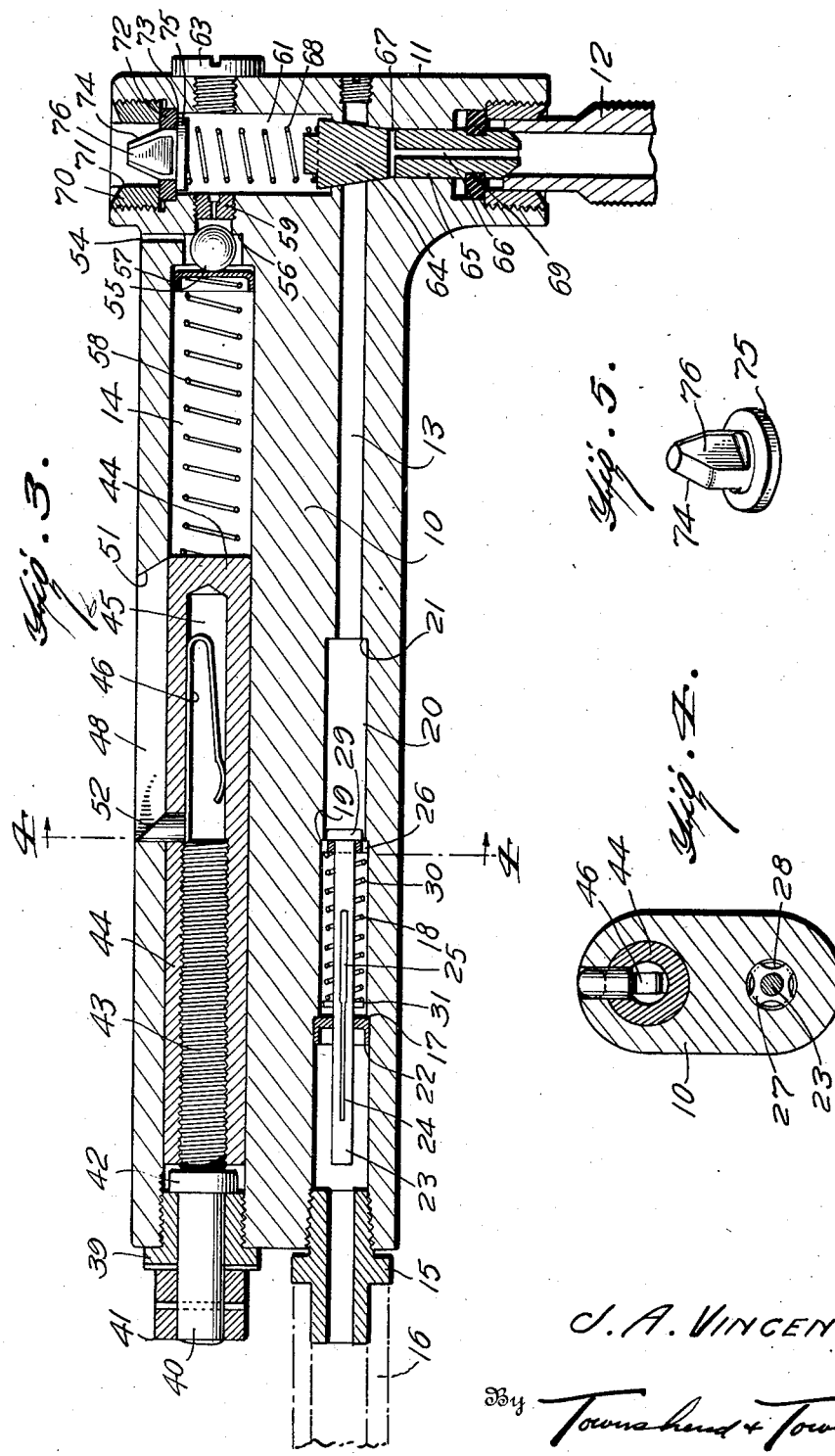

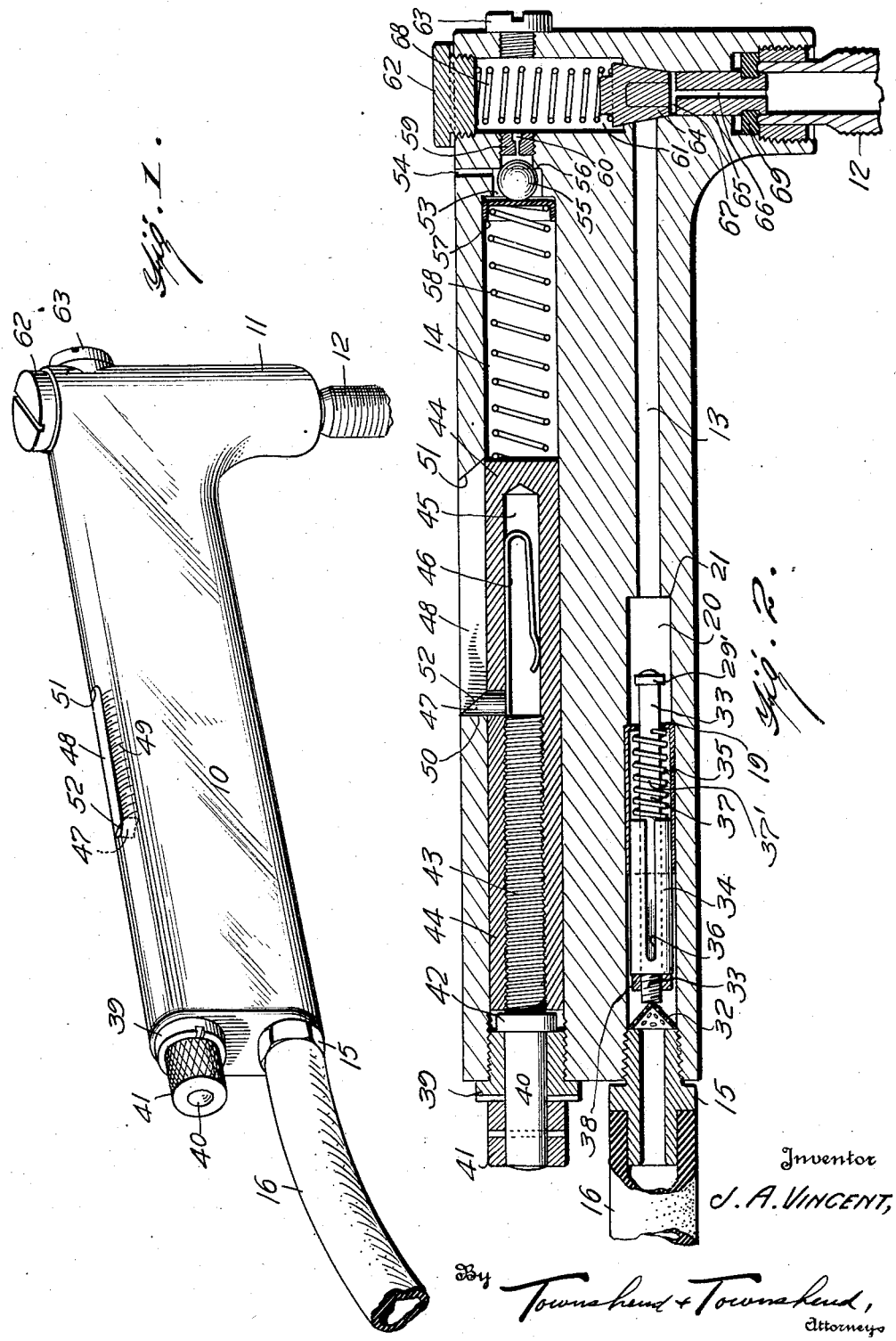

Patented July 21, 1931

1,815,533

UNITED STATES PATENT OFFICE

JAMES A. VINCENT, OF PROVIDENCE, RHODE ISLAND

TIRE CHUCK

Application filed May 25, 1929. Serial No. 365,941.

This invention relates to means for inflating and deflating pneumatic tires and is particularly directed to the provision of a novel tire chuck structure having pressure regulating and indicating means as an element thereof whereby pressure within a tire to which the chuck is applied may be automatically regulated through a predetermined setting of an indicator cooperating with pressure regulating means in the chuck.

Among the objects of the invention are: the provision in a tire chuck of a novel and improved automatic pressure supply governing means; the provision of a novel tire chuck having means for automatically regulating the passage of a supply of pneumatic pressure medium therethrough; the provision of a tire chuck having means for controlling an air supply by a predetermined control regulation mechanism; to provide in a device of this character a means for effecting deflation of a tire to a predetermined point; and generally to provide novel and improved structural details in a tire chuck assembly.

With these and such other objects in view as will be apparent from the description, the invention resides in the novel construction, combination and arrangement of parts hereinafter described and claimed and illustrated in the accompanying drawings, wherein are shown certain practical, physical embodiments of the principles underlying this invention.

Figure 1 is a perspective of a chuck constructed in accordance with the invention and as applied over the valve stem of a pneumatic tire.

Figure 2 is a vertical section taken longitudinally through one form of chuck as shown in Figure 1.

Figure 3 is a vertical section longitudinally through another form of chuck having the external configuration as shown in Figure 1.

Figure 4 is a transverse section on the line 4—4 of Figure 3.

Figure 5 is a detail perspective of a tire deflating element employed in the structure shown in Figure 3.

Certain structural details of the assembly are common to both forms of the invention and consist of an elongated body 10 substantially formed as an L-shaped casting with the short arm 11 formed as the tire valve stem engaging element over a valve stem indicated as at 12 in Figure 1.

The body 10 of the casting is sufficiently elongated to serve as a handle and is provided throughout its length with an air supply bore 13 positioned in parallel spaced relation directly below an upper bore 14 which is adapted and formed to contain the pressure relief means to be described.

At the inlet end of the air supply bore 13, a hollow coupling 15 is threaded into the body 10 and receives one end of an air supply hose 16 which may be of any conventional type, the coupling serving to establish communication between the air hose 16 and the bore 13. Adjacent the coupling 15 the inlet bore 13 extends for a short distance in a uniform internal diameter terminating in an annular shoulder 17 beyond which the bore continues in a section 18 of reduced diameter terminating in a second annular shoulder 19 beyond which the bore continues in a section 20 having a further reduced diameter terminating in the third annular shoulder 21 beyond which the major portion of the bore 13 continues in a further reduced uniform diameter, all of which is clearly shown in Figure 3. A cup-shaped header or washer 22 seats against the shoulder 17 and is provided with a central bore for slidably receiving therethrough a hollow tube 23 formed with a longitudinal side opening slot 24 of a uniform width throughout all that portion of the tube 23 which engages within the bore of the header 22 and extends in the direction of the coupling 15. Beyond the header 22 the slot 24 is enlarged in width as at 25, this enlarged slot being disposed within the section 18 of the inlet bore 13.

Abutting the shoulder 19 is a spider 26 having a plurality of radial arms 27 which engage the shoulder 19 and having a hub portion 28 provided with a central bore which receives one end of the tube 23 which extends therethrough and terminates in an enlarged head 29 closing the end of the tube and serving as a stop member for abutting engagement with the shoulder 21 in the bore section 20. The tube 23 is closed also at its outer end adjacent the coupling 15 and between the header 22 and the spider 26 the body of the tube is surrounded by a spiral expansion spring 30, one end of which abuts the spider 26 and the other a washer 31 rigidly secured to the body of the tube.

This mechanism as described comprises automatic air flow governing means which operates as follows: Air entering under pressure through the coupling 15 passes into the tube 23 through the slot 24 and expands through the slot 25 into the chamber consisting of the bore section 18. This air pressure acting against the tube and also through the spaces between the arms 27 and the spider against the head 29, causes a longitudinal movement of the tube 24 in the direction of air flow and against compression of the spring 30. As this longitudinal movement is increased it is obvious that the effective length of the slot 24 decreases and thereby cuts down the volume of air entering through this slot, so that the pressure decreases in the chamber sections 18 and 20 until an automatic balance has been reached which maintains an even flow of air under a constant pressure and prevents too great a surge of pressure at the commencement of the tire inflating operation.

In the form of automatic governor illustrated in Figure 2 the coupling 15 is provided at its inner end with a cage 32 adapted to abut one end of a stem 33 extending longitudinally through a pair of telescoping hollow tubular casings 34 and 35, the outermost of which is retained in position by seating engagement against the shoulder 19 of the bore 13, the inner end of the stem 33 being provided with a head 29' adapted for abutting engagement against the shoulder 21. The casing 34 is provided with a longitudinal side opening slot 36 whereby air entering through the coupling 15 passes to the interior of the casing section 35 and discharges through the end of the casing which seats against the shoulder 19. Longitudinal movement of the casing 34 is resisted by the action of a compression spring 37' surrounding the portion 37 of stem 33 between the apertured inner end of the casing 34 and the apertured inner end of the casing 35. In this form of governor I provide for a predetermined setting of the spring tension by means of a nut 38 threaded over the outer end of the stem 33 and adapted to bear against the outer end of the casing 34 whereby under rotation of the nut the two casings 34 and 35 may be telescoped or expanded for a desired initial setting before the governor assembly is inserted within the air inlet bore.

Above the coupling 15, the bore 14 in the inner portion of the body 10 is closed by a threaded bushing 39 disposed therein and provided with a central bore receiving a non-travelling stem 40 in rotatable relation therethrough, the outer end of the stem 40 having rigidly secured thereto an operating head 41 cooperating with an annular head or enlargement formed on the stem at the inner end of the bushing 39, whereby a rotatable movement of the stem is permitted but any longitudinal movement thereof is prevented. Beyond the head 42 the stem 40 is extended and is externally threaded throughout the portion 43 for engagement by a longitudinally elongated cylindrical plug 44 formed with a hollow center or bore 45 and internally threaded for engagement over the stem portion 43 whereby upon rotation of the stem 40 through manipulation of the operating head 41, the cylindrical plug 44 will be caused to move longitudinally within the bore 14.

A spring clip 46 mounted in the bore 45 of the plug 44 carries a pointer member 47 which extends laterally through the body of the plug 44 for slidable engagement through a slot 48 formed in the external face of the body 10. The tip of the pointer 47 cooperates with suitable scale indicia 49 arranged on the body 10 at the side edges of the slot 47, the graduations of which are suitably scaled to indicate pounds of pressure ranging from zero to a desired maximum. One end of the slot 48 terminates in a vertical wall 50 acting as a stop abutment for a vertical edge of the pointer 47, while the opposite end 51 of the slot is inwardly inclined for sliding cooperative engagement with a similarly inclined face 52 formed on the pointer so that when the faces 51 and 52 are brought into engagement under proper longitudinal movement of the plug 44, the pointer 47 is depressed and moves laterally inward of the plug against action of the spring clip 46 for a purpose to be hereinafter described.

The opposite end of the bore 14 communicates through a chamber 53 with a discharge outlet port 54 extending laterally through the body 10 and which chamber contains a ball valve 55 maintained in closed engagement against a seat 56 by means of a cup washer 57 bearing against the ball 55 through the action of an expansion spring 58 disposed in the bore 14 between the inner end of the plug 44 and the washer 57.

The ball valve seat 56 is disposed at one end of a passage which is substantially closed by a threaded plug 59 having a central reduced bore 60 extending therethrough and opening in communication with a vertical expansion chamber 61 arranged in the portion 11 of the body 10. This expansion chamber 61 is cylindrical and in the form shown in Figure 2 is closed at its upper end by a cap 62 threaded into the body 10 of the casting. Directly opposite the plug 59 the casting is provided with a removable plug 63 whereby access may be had to the plug 59 when the plug 63 is removed.

In the form of construction as shown in Figure 2, the end of the air inlet bore 13 is normally closed by a conical valve plug 64 having a depending cylindrical body portion 65 provided with a central longitudinal passage 66 open at its lower end for communication with the tire valve stem 12 and having communication at its upper end with a lateral branch passage 67 which establishes communication with the bore 13 when the valve plug is in elevated position. The top of the conical plug portion 64 extends into the chamber 61 and is formed to engage one end of a coiled expansion spring 68 disposed within the chamber and abutting the plug 64 at its lower end and the cap plug 62 at its upper end so that its normal function is to maintain the conical plug portion 64 depressed into engagement with its seat whereby the passage 67 is disposed out of communication with the bore 13 and the valve is closed.

The lower end of the cylindrical portion 65 of the valve plug carries a rubber sealing washer 69 which is adapted for sealing engagement with the tire valve stem 12 when the chuck is applied thereover, as shown in Figure 2, the manual depression of the chuck serving to lift the valve 64—65 against action of the spring 68 and therefore to establish communication not only between the inlet bore 13 and the bore of the valve stem 12, but also between the bore of the valve stem 12 and the expansion chamber 61. At the same time communication is established between the bore 13 and the expansion chamber 61.

In the form of construction shown in Figure 3, the chuck head is provided with means for deflating a tire and in this embodiment the cap plug 62, as shown in Figure 2, is replaced by a ring nut 70 having an enlarged central bore 71 and acting to compress a washer 72 against the seat 73 formed at one end of the expansion chamber 61. A depressible plug 74, shown in detail in Figure 5, operates through the washer 72 and is formed with an enlarged flat head 75 having a bearing engagement against the upper end of the spring 68, the side walls of the body 74 above the head 75 being cut away in flat parallel faces 76 so that when the plug 74 is sufficiently depressed by manual operation through the bore 71, air may escape from the chamber 61 around the head 75 and through the washer 72 along the flat faces 76 for deflating the tire.

In the operation of the chuck when it is desired to inflate a tire, for instance to a pressure of thirty-five pounds, the operating head 41 is turned until the dial 47 registers with the thirty-five pound indication on the scale 49 after which the chuck head 11 is applied over the valve stem 12 and pressed down in the conventional manner. This operation raises and opens the valve 64—65 whereupon if the tire pressure be below the desired amount, air will enter from the bore 13 through the valve passages 67 and 66 into the tire and at the same time the air under pressure will also enter the expansion chamber 61 acting against the ball valve 55, which valve, however, is held in closed position through the action of the spring 58 disposed between the plug 44 and the cup washer 57. When a pressure of thirty-five pounds has been reached in the tire, an increased air pressure will cause the ball valve 55 to open as the spring 58 has been set only for a pressure of thirty-five pounds under the regulation of the pointer 47. When the valve 55 opens the excess air will discharge through the passage 60 and through the exhaust port 54.

If the tire pressure is above the desired point which is set by the pointer 47, when the valve 64—65 opens, the excess air will be discharged in the manner just described through the valve 55 and exhaust port 54 as well as such air which enters under pressure through the bore 13.

In the construction of chuck as illustrated in Figure 3 a tire may be deflated by turning the chuck to engage the plug 76 with the valve stem. The plug 76 may then be depressed against action of the spring 68 after the chuck head has been applied over the valve stem 12, whereupon the air within the tire will exhaust around the head 75 through the washer 72 and outwardly along the flat faces 76 of the plug.

The automatic air flow governing means has been previously described in detail, and as stated, it functions to prevent too great a surge of air pressure at the initial inflating and maintains a uniformity of flow throughout the entire operation.

While I have illustrated and described in this specification certain details of construction, I desire it to be understood that the invention described is not to be limited thereto but that any desired changes and modifications may be made within the structural details as will fall within the scope of the invention as claimed.

I claim:

1. A tire chuck comprising a substantially L-shaped casting having a pair of parallel spaced longitudinally disposed bores formed in the long portion thereof and communicating at one end with a transverse bore extending through the short portion thereof, a valve in said transverse bore having a seat common thereto and to one of said longitudinal bores and normally closing both said bores simultaneously, said valve being operable to open position by engagement of the chuck over a tire valve stem, that longitudinal bore which is closed by the valve having connection with means for supplying air thereto under pressure, and means operable in the other of said longitudinally disposed bores for controlling exhaust of air from said chuck at a predetermined pressure point.

2. A tire chuck comprising a substantially L shaped casting having a pair of parallel spaced longitudinally extending bores in the long portion thereof and communicating at one end with a transverse bore provided entirely through the short portion, one of said longitudinal bores being adapted for supplying air under pressure, a tire stem operated valve seated in and normally closing both said air supply bore and the transverse bore at one end thereof, a tire stem operated valve seated in and normally closing the other end of said transverse bore, an expansion spring housed in said transverse bore and bearing at its ends against both of said valves, and adjustable exhaust valve means disposed in the other of said longitudinal bores.

In testimony whereof I affix my signature.

JAMES A. VINCENT.